US012681504B2

(12) United States Patent
Hashizume et al.

(10) Patent No.: US 12,681,504 B2
(45) Date of Patent: Jul. 14, 2026

(54) WORK VEHICLE, CONTROL DEVICE, CONTROL METHOD, AND SYSTEM

(71) Applicant: HONDA MOTOR CO., LTD., Tokyo (JP)

(72) Inventors: Takashi Hashizume, Wako (JP); Ryuichi Kimata, Tokyo (JP); Ryota Hisada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 41 days.

(21) Appl. No.: 18/770,572

(22) Filed: Jul. 11, 2024

(65) Prior Publication Data

US 2024/0361781 A1 Oct. 31, 2024

Related U.S. Application Data

(63) Continuation of application No. PCT/JP2022/001676, filed on Jan. 18, 2022.

(51) Int. Cl.
G05D 1/667 (2024.01)
G05D 1/244 (2024.01)
(Continued)

(52) U.S. Cl.
CPC ............. G05D 1/667 (2024.01); G05D 1/244 (2024.01); G06T 7/73 (2017.01); G05D 2101/20 (2024.01);
(Continued)

(58) Field of Classification Search
CPC .... G05D 1/667; G05D 1/244; G05D 2101/22; G05D 2101/20; G06T 2207/30204; G06T 2207/30252
(Continued)

(56) References Cited

U.S. PATENT DOCUMENTS

| | | | |
|---|---|---|---|
| 2020/0103882 A1* | 4/2020 | Sullivan | G05B 19/41895 |
| 2024/0278680 A1* | 8/2024 | Khullar | B66F 7/28 |

(Continued)

FOREIGN PATENT DOCUMENTS

| | | |
|---|---|---|
| JP | H03-033903 A | 2/1991 |
| JP | H05-186199 A | 7/1993 |

(Continued)

OTHER PUBLICATIONS

International Search Report for PCT/JP2022/001676 mailed Mar. 29, 2022 with partial English Translation.

*Primary Examiner* — Yazan A Soofi
(74) *Attorney, Agent, or Firm* — THOMAS I HORSTEMEYER, LLP

(57) ABSTRACT

A work vehicle capable of autonomously moving in a work area, the work vehicle including a control unit, wherein the control unit starts an alignment in response to a request for the alignment from a manned forklift acquired via a communication unit, determines whether or not a positional relation between the work vehicle and the manned forklift is in a state before starting the alignment, and notifies the manned forklift that a movement direction of the work vehicle and a movement direction of the manned forklift are not orthogonal to each other via the communication unit, when the positional relation between the work vehicle and the manned forklift is not in the state.

9 Claims, 4 Drawing Sheets

(51) Int. Cl.
*G05D 101/00* (2024.01)
*G05D 101/20* (2024.01)
*G06T 7/73* (2017.01)

(52) U.S. Cl.
CPC .................... *G05D 2101/22* (2024.01); *G06T 2207/30204* (2013.01); *G06T 2207/30252* (2013.01)

(58) Field of Classification Search
USPC ........................................................ 701/28
See application file for complete search history.

(56) References Cited

U.S. PATENT DOCUMENTS

| 2025/0051152 A1* | 2/2025 | Zhang ..................... B66F 9/063 |
| 2025/0100859 A1* | 3/2025 | Yamaguchi ............... B66F 9/24 |

FOREIGN PATENT DOCUMENTS

| JP | H06-309030 A | 11/1994 |
| JP | H08-110815 A | 4/1996 |
| JP | 2013-061736 A | 4/2013 |
| JP | 2013-209211 A | 10/2013 |
| JP | 2021-088440 A | 6/2021 |
| WO | 2023/139666 A1 | 7/2023 |

* cited by examiner

F I G. 2
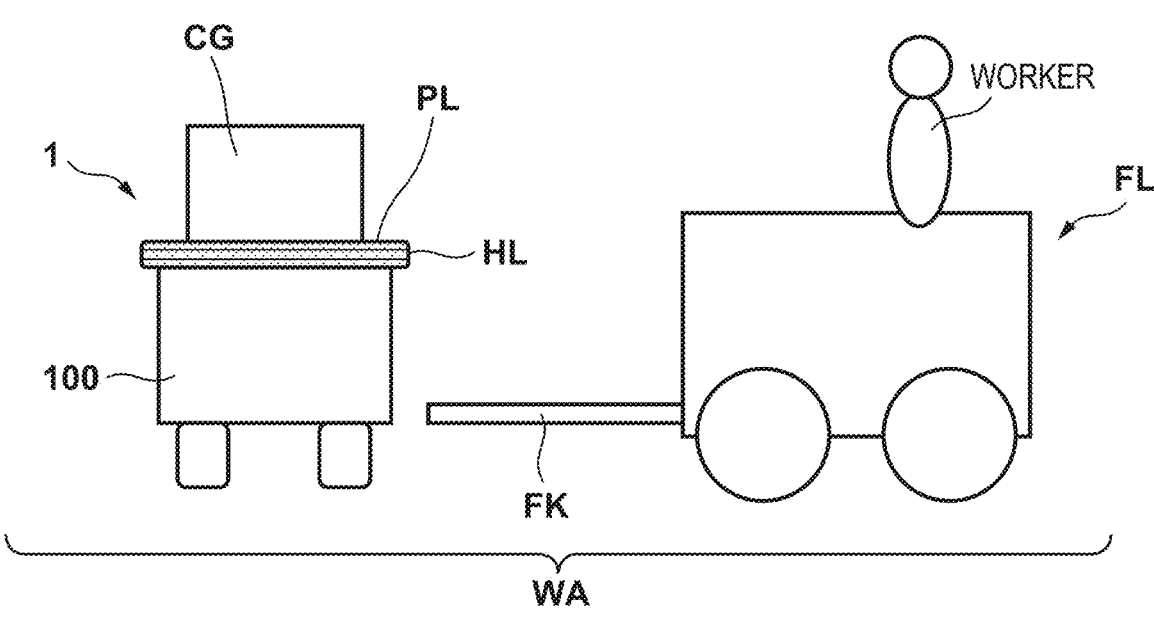
F I G. 3
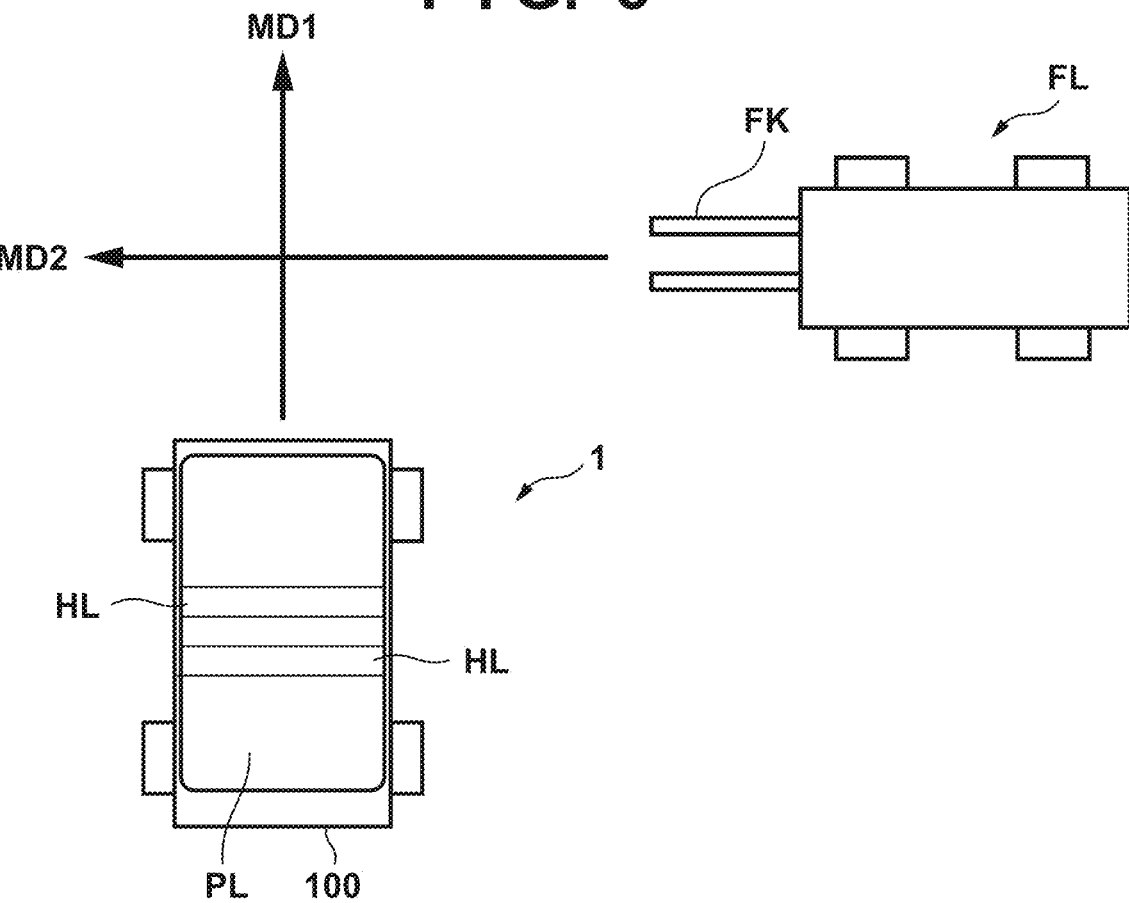

F I G. 4
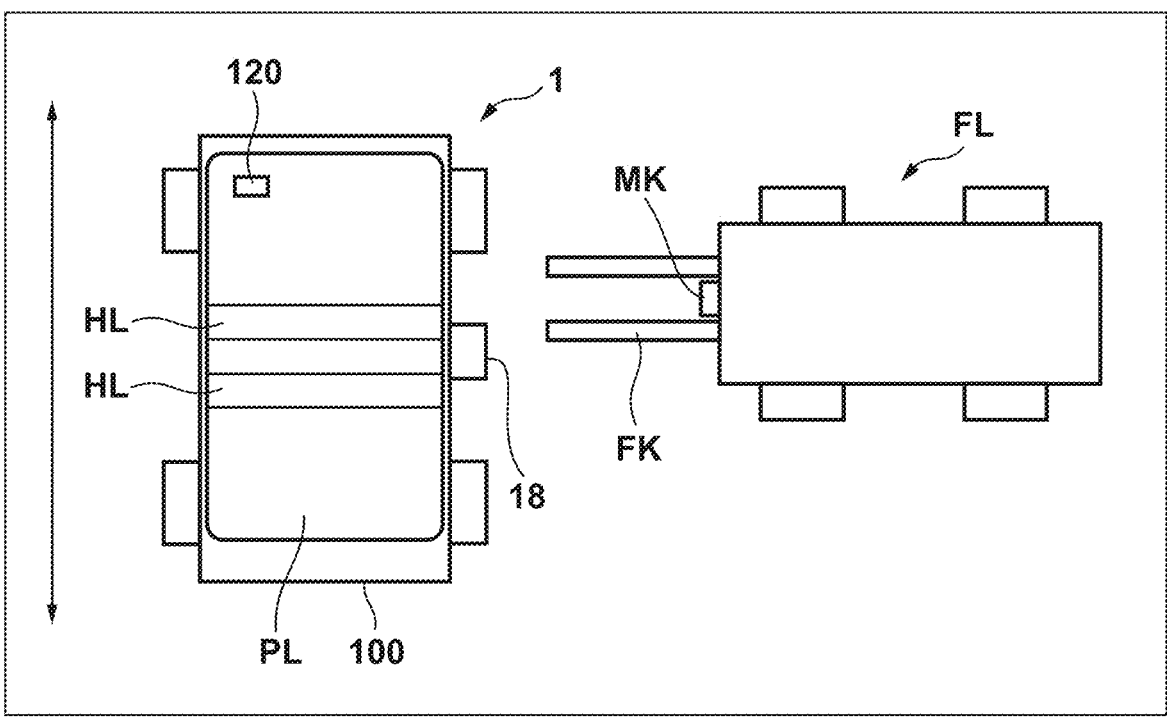
F I G. 5
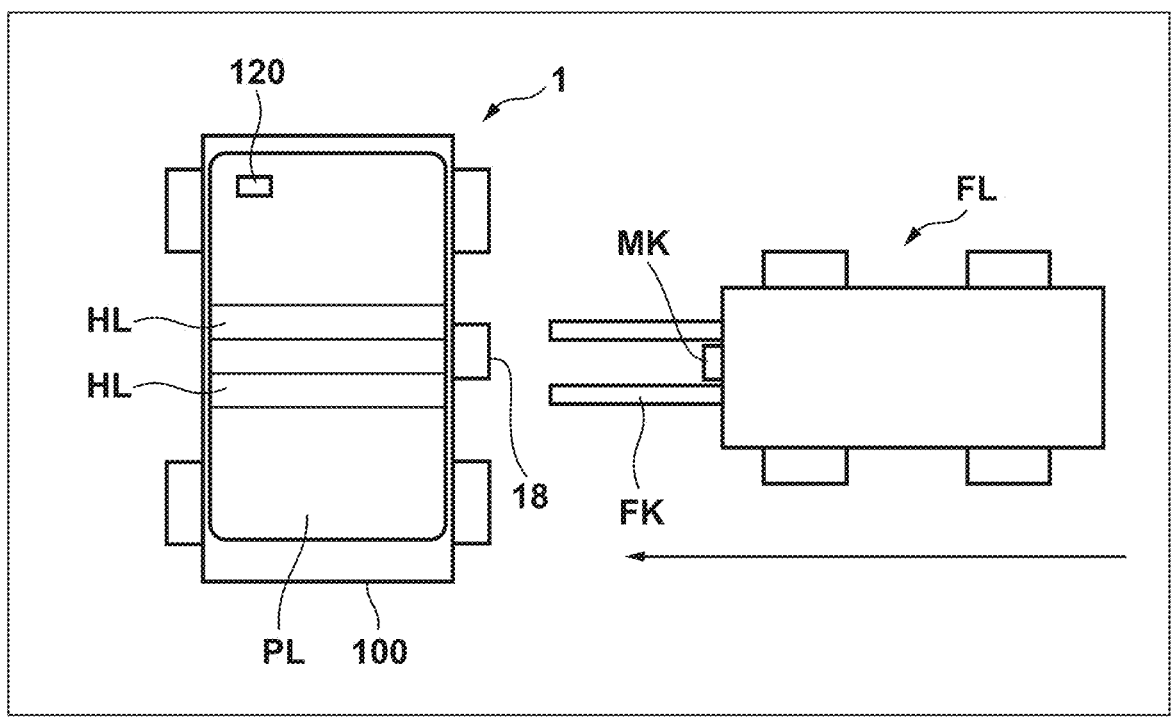

WORK VEHICLE, CONTROL DEVICE, CONTROL METHOD, AND SYSTEM

CROSS-REFERENCE TO RELATED APPLICATION(S)

This application is a Continuation of International Patent Application No. PCT/JP2022/001676, filed on Jan. 18, 2022, the entire disclosures of which are incorporated herein by reference.

BACKGROUND OF THE INVENTION

Field of the Invention

The present invention relates to a work vehicle, a control device, a control method, and a system.

Description of the Related Art

In recent years, in a workplace (work area) such as a construction site or a building site, an autonomous work vehicle (AWV) that automatically and autonomously travels in the work area to perform predetermined work (for example, transportation of cargo such as materials, water, and other supplies, loading and unloading of the cargo, and the like) without requiring an operation (driving) by a worker has been increasingly used. The autonomous work vehicle is disclosed in Japanese Patent Laid-Open No. 2021-88440 and Japanese Patent Laid-Open No. 8-110815. In such a workplace, not only the autonomous work vehicle but also a forklift (manned forklift) that loads and unloads cargo by the operation by the worker is used.

In the workplace using the autonomous work vehicle and the manned forklift, when cargo is loaded and unloaded (work) between the autonomous work vehicle and the manned forklift, it is easily conceivable to align the autonomous work vehicle on the side of the manned forklift that can be operated by the worker.

However, the forklift is generally a rear wheel steering device that gives a steering angle to a rear wheel, and cannot steer a front wheel. For this reason, the forklift cannot easily move in a lateral direction. Therefore, in a case where it is necessary to perform movement of the forklift in the lateral direction, particularly, fine adjustment in the lateral direction at the time of aligning the manned forklift with respect to the autonomous work vehicle, it is difficult to realize highly accurate alignment even for a skilled worker. In addition, in order to move the forklift in the lateral direction, it is necessary to move the forklift forward and backward to repeat turning back, which requires time for alignment.

SUMMARY OF THE INVENTION

The present invention provides new technology for easily aligning a manned forklift with a work vehicle autonomously movable in a work area.

According to a first aspect of the present invention, there is provided a work vehicle capable of autonomously moving in a work area, the work vehicle including a detection unit configured to detect a position of a manned forklift stopped in the work area, a communication unit configured to communicate with the manned forklift, and a control unit configured to align the work vehicle with the manned forklift by moving the work vehicle forward, backward, or forward and backward based on the position of the manned forklift detected by the detection unit such that a cargo is capable of being loaded and unloaded between the manned forklift and the work vehicle, wherein the alignment is performed in a positional relation in which the work vehicle and the manned forklift are in a state in which a movement direction of the work vehicle and a movement direction of the manned forklift are orthogonal to each other, the control unit starts the alignment in response to a request for the alignment from the manned forklift acquired via the communication unit, determines whether or not the positional relation between the work vehicle and the manned forklift is in the state before starting the alignment, and notifies the manned forklift that the movement direction of the work vehicle and the movement direction of the manned forklift are not orthogonal to each other via the communication unit, when the positional relation between the work vehicle and the manned forklift is not in the state.

According to a second aspect of the present invention, there is provided a control device for a work vehicle capable of autonomously moving in a work area, the control device including a detection unit configured to detect a position of a manned forklift stopped in the work area, a communication unit configured to communicate with the manned forklift, and a control unit configured to align the work vehicle with the manned forklift by moving the work vehicle forward, backward, or forward and backward based on the position of the manned forklift detected by the detection unit such that a cargo is capable of being loaded and unloaded between the manned forklift and the work vehicle, wherein the alignment is performed in a positional relation in which the work vehicle and the manned forklift are in a state in which a movement direction of the work vehicle and a movement direction of the manned forklift are orthogonal to each other, the control unit starts the alignment in response to a request for the alignment from the manned forklift acquired via the communication unit, determines whether or not the positional relation between the work vehicle and the manned forklift is in the state before starting the alignment, and notifies the manned forklift that the movement direction of the work vehicle and the movement direction of the manned forklift are not orthogonal to each other via the communication unit, when the positional relation between the work vehicle and the manned forklift is not in the state.

According to a third aspect of the present invention, there is provided a method for controlling a work vehicle capable of autonomously moving in a work area, the method including a first step of detecting a position of a manned forklift stopped in the work area, a second step of communicating with the manned forklift, and a third step of aligning the work vehicle with the manned forklift by moving the work vehicle forward, backward, or forward and backward based on the position of the manned forklift detected in the first step such that a cargo is capable of being loaded and unloaded between the manned forklift and the work vehicle, wherein the alignment is performed in a positional relation in which the work vehicle and the manned forklift are in a state in which a movement direction of the work vehicle and a movement direction of the manned forklift are orthogonal to each other, and the third step includes starting the alignment in response to a request for the alignment from the manned forklift acquired in the second step, determining whether or not the positional relation between the work vehicle and the manned forklift is in the state before starting the alignment, and notifying the manned forklift that the movement direction of the work vehicle and the movement direction of the manned forklift are not orthogonal to each other, when the positional relation between the work vehicle and the manned forklift is not in the state.

According to a fourth aspect of the present invention, there is provided a system including a work vehicle capable of autonomously moving in a work area and a server managing movement of the work vehicle, wherein the work vehicle includes a detection unit detecting a position of a manned forklift stopped in the work area, and a communication unit communicating with the manned forklift, the server includes a control unit aligning the work vehicle with the manned forklift by moving the work vehicle forward, backward, or forward and backward based on the position of the manned forklift detected by the detection unit such that a cargo is capable of being loaded and unloaded between the manned forklift and the work vehicle, the alignment is performed in a positional relation in which the work vehicle and the manned forklift are in a state in which a movement direction of the work vehicle and a movement direction of the manned forklift are orthogonal to each other, the control unit starts the alignment in response to a request for the alignment from the manned forklift acquired via the communication unit, determines whether or not the positional relation between the work vehicle and the manned forklift is in the state before starting the alignment, and notifies the manned forklift that the movement direction of the work vehicle and the movement direction of the manned forklift are not orthogonal to each other via the communication unit, when the positional relation between the work vehicle and the manned forklift is not in the state.

Further features of the present invention will become apparent from the following description of exemplary embodiments with reference to the attached drawings.

BRIEF DESCRIPTION OF THE DRAWINGS

FIG. 2 is a diagram illustrating alignment between the work vehicle and a manned forklift.

FIG. 3 is a diagram illustrating alignment between the work vehicle and the manned forklift.

FIG. 4 is a diagram illustrating alignment between the work vehicle and the manned forklift.

FIG. 5 is a diagram illustrating alignment between the work vehicle and the manned forklift.

DESCRIPTION OF THE EMBODIMENTS

Figure 1:
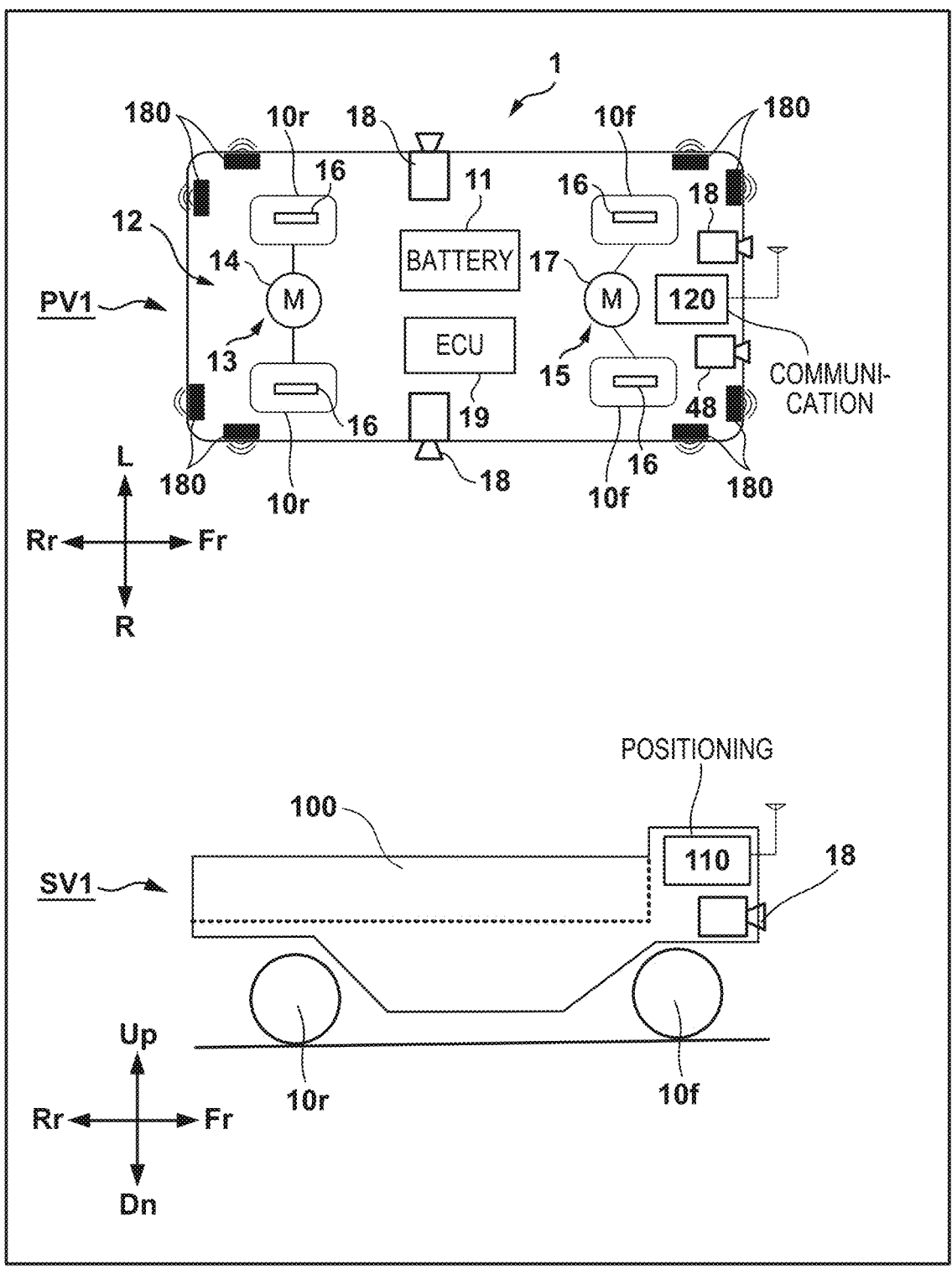
FIG. 1 is a schematic view illustrating a configuration of a work vehicle as one aspect of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 is a schematic view illustrating a configuration of a work vehicle 1 as one aspect of the present invention, where PV1 is a plan view of the work vehicle 1, and SV1 is a side view of the work vehicle 1. Fr, Rr, L, and R illustrated in FIG. 1 represent a front side, a rear side, a left side, and a right side at the time of forward movement of the work vehicle 1, respectively. In addition, Up and Dn illustrated in FIG. 1 represent sides above and below the work vehicle 1, respectively.

The work vehicle 1 is, for example, a vehicle (autonomous work vehicle) that can autonomously move (travel) in a work area embodied as a workplace such as a construction site, a building site, or a warehouse without requiring the operation (driving) by a worker. Therefore, the work vehicle 1 is a vehicle that does not include a driver's seat or a driving mechanism for a passenger, and is unmanned during traveling. In the present embodiment, the work vehicle 1 is a four-wheeled vehicle including two front wheels 10*f* and two rear wheels 10*r*. The work vehicle 1 has a cargo bed 100 for loading cargo including materials, water, other supplies, and the like. In the present embodiment, the cargo is placed on a pallet, and the work vehicle 1 loads the pallet on which the cargo is placed on the cargo bed 100 and transports the cargo (via the pallet).

The work vehicle 1 is an electric vehicle whose main power supply is a battery 11. The battery 11 is, for example, a secondary battery such as a lithium-ion battery. The work vehicle 1 self-travels by electric power supplied from the battery 11.

The work vehicle 1 includes an electric traveling mechanism 12 for realizing autonomous movement. The electric traveling mechanism 12 includes a traveling mechanism 13, a steering mechanism 15, and a braking mechanism 16.

The traveling mechanism 13 is a mechanism for moving the work vehicle 1 forward or backward using a traveling motor 14 as a drive source, and in the present embodiment, the rear wheel 10*r* is driven as a drive wheel. Each of the front wheel 10*f* and the rear wheel 10*r* is provided with the braking mechanism 16 such as a disc brake.

In the present embodiment, the steering mechanism 15 is a mechanism that gives a steering angle to the front wheel 10*f* using a steering motor 17 as a drive source. However, the steering mechanism 15 may be configured as a two-wheel steering mechanism that steers only the front wheels 10*f*, or may be configured as a four-wheel steering mechanism that steers the front wheels 10*f* and the rear wheels 10*r*.

The work vehicle 1 includes a detection unit 180 that detects a surrounding situation. The detection unit 180 includes an external sensor group that monitors the periphery of the work vehicle 1. The external sensor includes, for example, a millimeter-wave radar, and detects an obstacle around the work vehicle 1 or a vehicle existing in the work area by radio waves, that is, a manned forklift in the present embodiment. In addition, the external sensor includes, for example, light detection and ranging (LiDAR), and detects an obstacle around the work vehicle 1 or a vehicle existing in the work area by light, that is, a manned forklift in the present embodiment. A control unit (ECU) 19 can acquire information regarding an obstacle around the work vehicle 1 or information regarding a manned forklift existing in the work area by analyzing information detected by the detection unit 180. Note that the detection unit 180 including the external sensor can also be provided on each of a front portion, a rear portion, and left and right side portions of the work vehicle 1. Accordingly, the detection unit 180 can monitor all sides of the work vehicle 1.

Here, the manned forklift is a rear wheel steering vehicle that gives a steering angle to the rear wheel by the operation by the worker, and is a vehicle that cannot steer the front wheel. The manned forklift is embodied as a forklift that performs loading and unloading of cargo with respect to the work vehicle 1. The manned forklift unloads the cargo loaded on the cargo bed 100 of the work vehicle 1, in the present embodiment, the pallet on which the cargo is placed, or loads the pallet on which the cargo is placed on the cargo bed 100 of the work vehicle 1.

The work vehicle 1 further includes a positioning sensor 110 and a communication device 120. The positioning sensor 110 receives a positioning signal from an artificial satellite that constitutes a global navigation satellite system (GNSS). An example of the GNSS is a global positioning system (GPS). The positioning sensor 110 receives a positioning signal (a GNSS signal, for example, a GPS signal), and detects a current position of the work vehicle 1. The communication device 120 includes a function of communicating with a server that manages the work vehicle 1 and a function of performing vehicle-to-vehicle communication with the manned forklift existing in the work area.

The work vehicle 1 includes an image acquisition unit 18 that images the periphery of the work vehicle 1 to acquire an image. The image acquisition unit 18 includes a camera. As illustrated in FIG. 1, the image acquisition unit 18 is provided, for example, on the front and the side of the work vehicle 1, and acquires front and side images when the work vehicle 1 moves. The image acquired by the image acquisition unit 18 is subjected to image processing (analyzed) by the control unit 19, and is used to acquire information regarding the manned forklift existing in the work area. Specifically, the information regarding the manned forklift includes a distance from the manned forklift (current position of the manned forklift), a movement speed of the manned forklift, and the like. In the present embodiment, in particular, the position of the manned forklift stopped in the work area is acquired as the information regarding the manned forklift. Therefore, the image acquisition unit 18 functions as a detection unit that detects the position of the manned forklift stopped in the work area in cooperation with the control unit 19. Note that the image acquisition unit 18 may be provided on the rear of the work vehicle 1 in addition to the front and the side of the work vehicle 1, and can also acquire a rear image of the work vehicle 1.

The work vehicle 1 further includes a control unit 19. The control unit 19 includes a processor represented by a CPU, a storage device such as a semiconductor memory or a hard disk, and an interface with an external device. In the storage device, programs to be executed by the processor, data (map information) to be used by the processor for processing, and the like are stored. A plurality of sets of processors, storage devices, and interfaces may be provided for each function of the work vehicle 1 so as to be able to communicate with each other.

The control unit 19 controls the movement (autonomous movement) of the work vehicle 1 via the electric traveling mechanism 12 based on the detection result of the detection unit 180, the detection result of the positioning sensor 110, the image acquired by the image acquisition unit 18, and the like. Further, in the present embodiment, the control unit 19 performs alignment of the work vehicle 1 with respect to the manned forklift.

Note that, in the present embodiment, the alignment of the work vehicle 1 with respect to the manned forklift means adjusting the position of the work vehicle 1 with respect to the manned forklift by moving the work vehicle 1 forward, backward, or forward and backward without moving the manned forklift such that cargo can be loaded and unloaded between the manned forklift and the work vehicle 1. As described above, the forklift can steer the rear wheel, but cannot steer the front wheel. For this reason, the forklift cannot easily move in the lateral direction. However, in order to align the work vehicle 1 and the manned forklift, it is basically necessary to relatively move the work vehicle 1 and the manned forklift in the lateral direction.

Therefore, in the present embodiment, it is possible to realize highly accurate alignment in a short time by moving only the work vehicle 1 in a state where the manned forklift is stopped without moving the manned forklift.

Hereinafter, the alignment of the work vehicle 1 with respect to the manned forklift will be specifically described. As described above, such alignment is performed by the control unit 19 integrally controlling each unit of the work vehicle 1.

As illustrated in FIG. 2, the work vehicle 1 and the manned forklift FL exist in a work area WA such as a construction site, a building site, or a warehouse, and alignment between the work vehicle 1 and the manned forklift FL is performed under the control of the control unit 19 in order to load and unload a cargo CG between the work vehicle 1 and the manned forklift FL. In the present embodiment, it is assumed that the cargo CG placed on the pallet PL is loaded and unloaded, and a case where the pallet PL (cargo CG) loaded on the cargo bed 100 of the work vehicle 1 is unloaded from the work vehicle 1 via a fork FK of the manned forklift FL that can move up and down in an up-and-down direction and can slide in a front-and-rear direction will be described as an example. In addition, the pallet PL is provided with an insertion/removal hole HL (through hole) through which the fork FK can be inserted and removed. The manned forklift FL can easily load and unload the pallet PL (cargo CG placed on the pallet PL) by moving up and down the fork FK in the up-and-down direction or sliding the fork FK in the front-and-rear direction in a state where the fork FK is inserted into the insertion/removal hole HL.

In the alignment of the work vehicle 1 with respect to the manned forklift FL, first, the work vehicle 1 is moved to the vicinity of the manned forklift FL stopped in the work area, for example, at a loading/unloading position of the cargo CG. At this time, the work vehicle 1 is moved such that the manned forklift FL is located on the side of the work vehicle 1, specifically, as illustrated in FIG. 3, a movement direction MD1 of the work vehicle 1 and a movement direction MD2 of the manned forklift FL intersect (orthogonal) with each other.

Subsequently, the image acquisition unit 18 provided on the front and the side of the work vehicle 1, particularly, the side images the manned forklift FL located on the side of the work vehicle 1 to acquire an image, and performs image processing on the image to detect (specify) the position of the manned forklift FL stopped in the work area. For example, as illustrated in FIG. 4, the image acquisition unit 18 (camera) acquires an image including a marker MK provided on the manned forklift FL, and recognizes (a position of) the marker MK included in the image. A positional relation between the position of the marker MK provided on the manned forklift FK and a reference position of the manned forklift FK is known (acquired in advance) and stored in the storage device of the control unit 19. Therefore, the reference position of the manned forklift FK can be detected by recognizing the marker MK included in the image acquired by the image acquisition unit 18 and specifying the position of the marker MK. Note that the reference position of the manned forklift FK can be set to an arbitrary position of the manned forklift FK, and includes, for example, a center position of the manned forklift FK, a gravity center position, a position of the fork FK, and the like. As such, the position (reference position) of the manned forklift FK can be easily detected by recognizing the marker MK included in the image acquired by the image acquisition unit 18.

When the position of the manned forklift FK is detected, the detection unit 180 that detects the surrounding situation of the work vehicle 1 may be used in addition to the image acquisition unit 18. By using the information regarding the manned forklift acquired by the detection unit 180 together with the image acquired by the image acquisition unit 18, the position of the manned forklift FK can be detected with higher accuracy.

Next, the work vehicle 1 is aligned with respect to the manned forklift FL, based on the position of the manned forklift FL stopped in the work area detected based on the image acquired by the image acquisition unit 18. Specifically, the position of the work vehicle 1 with respect to the manned forklift FL is adjusted by moving the work vehicle 1 in the movement direction MD1, that is, moving the work vehicle 1 forward, backward, or forward and backward such that the cargo CG can be loaded and unloaded between the work vehicle 1 and the manned forklift FL at the loading and unloading position of the cargo CG.

For example, as illustrated in FIG. 5, based on the position of the manned forklift FL stopped in the work area, the work vehicle 1 is moved such that the position of the insertion/removal hole HL provided in the pallet PL loaded on the cargo bed 100 of the work vehicle 1 is matched with the position (tip) of the fork FK of the manned forklift FL. While the work vehicle 1 is moved with respect to the manned forklift FL stopped in the work area (alignment between the work vehicle 1 and the manned forklift FL), the work vehicle 1 and the manned forklift FL maintain a positional relation in which the movement directions MD1 and MD2 thereof are orthogonal to each other. Note that FIG. 5 illustrates that the position of the insertion/removal hole HL and the position of the fork FK are matched with each other in the front-and-rear direction (Fr and Rr) of the work vehicle 1, but similarly, it is necessary to match the position (height position) of the insertion/removal hole HL and the position (height position) of the fork FK in the up-and-down direction (Up and Dn) of the work vehicle 1.

As described above, by moving only the work vehicle 1 with respect to the manned forklift FL stopped in the work area, that is, by aligning the work vehicle 1 and the manned forklift FL not on the side of the manned forklift FL where it is difficult to perform movement in the lateral direction, particularly, fine adjustment in the lateral direction, but on the side of the autonomously movable work vehicle 1, highly accurate alignment can be easily realized. Further, the manned forklift FL can realize the alignment between the work vehicle 1 and the manned forklift FL in a short time by maintaining a stopped state in the work area while the alignment between the work vehicle 1 and the manned forklift FL is performed. This is because alignment between the work vehicle 1 and the manned forklift FL can be performed only by moving the work vehicle 1 forward, backward, or forward and backward, and it is not necessary to repeat turning back by moving the manned forklift FL forward and backward.

Figure 6:
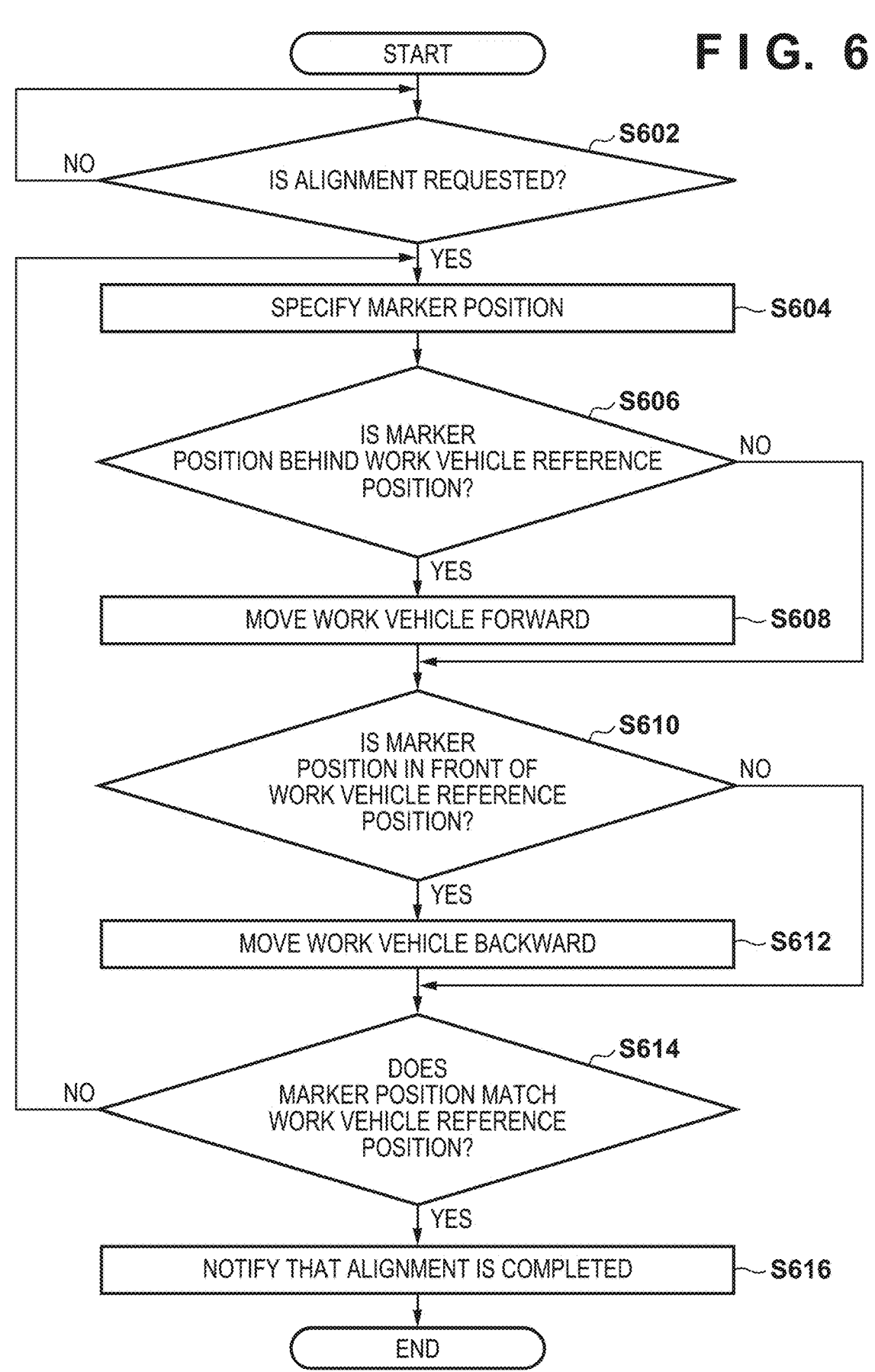
FIG. 6 is a flowchart illustrating alignment between the work vehicle and the manned forklift.

An example of alignment (alignment control) between the work vehicle 1 and the manned forklift FL will be described with reference to FIG. 6. Here, it is assumed that the work vehicle 1 has already moved to the vicinity of the manned forklift FL stopped in the work area (the loading/unloading position of the cargo CG), and the positional relation between the work vehicle 1 and the manned forklift FL is in a state where the movement direction MD1 of the work vehicle 1 and the movement direction MD2 of the manned forklift FL are orthogonal to each other.

In S602, the control unit 19 determines whether or not alignment between the work vehicle 1 and the manned forklift FL is requested from the manned forklift FL. It is possible to determine whether or not alignment is requested from the manned forklift FL according to, for example, whether or not an instruction to request the alignment is acquired (input) from the manned forklift FL via the communication device 120. Further, the instruction to request the alignment from the manned forklift FL is sent to the work vehicle 1 (communication device 120), for example, when the worker operating the manned forklift FL operates (pushes) an alignment start switch provided on an operation panel or the like for operating the manned forklift FL. As described above, in the present embodiment, the communication device 120 functions as a communication unit that communicates with the manned forklift FL.

When the instruction to request the alignment is not acquired from the manned forklift FL via the communication device 120, the determination as to whether or not the alignment is requested from the manned forklift FL (S602) is repeated. On the other hand, when the instruction to request the alignment is acquired from the manned forklift FL via the communication device 120, the process proceeds to S604. As such, the control unit 19 starts alignment between the work vehicle 1 and the manned forklift FL in response to the alignment request from the manned forklift FL acquired via the communication device 120. As a result, it is possible to start alignment between the work vehicle 1 and the manned forklift FL at timing convenient for the worker who operates the manned forklift FL, that is, at arbitrary timing on the worker side.

In S604, the control unit 19 images the manned forklift FL by the image acquisition unit 18 to acquire an image, and specifies the position of the manned forklift FL. In the present embodiment, first, as described above, an image including the marker MK provided on the manned forklift FL is acquired. Then, the control unit 19 performs image processing on the image acquired by the image acquisition unit 18, recognizes the marker MK included in the image, and specifies (detects) a position of the marker MK as the position of the manned forklift FL.

In S606, the control unit 19 determines whether or not the position of the marker MK specified in S604 is located behind a reference position of the work vehicle 1 in the front-and-rear direction. Note that the reference position of the work vehicle 1 can be set at an arbitrary position of the manned forklift FL. However, the reference position of the work vehicle 1 is basically set to the position of the work vehicle 1 facing the marker MK provided on the manned forklift FL when the alignment between the work vehicle 1 and the manned forklift FL is completed, that is, when the position of the insertion/removal hole HL provided in the pallet PL loaded on the cargo bed 100 of the work vehicle 1 is matched with the position of the fork FK of the manned forklift FL.

When the position of the marker MK is located behind the reference position of the work vehicle 1, the process proceeds to S608. On the other hand, when the position of the marker MK is not located behind the reference position of the work vehicle 1, the process proceeds to S610.

In S608, the control unit 19 moves the work vehicle 1 forward via the electric traveling mechanism 12 such that the position of the marker MK specified in S604 is matched with the reference position of the work vehicle 1.

In S610, the control unit 19 determines whether or not the position of the marker MK specified in S604 is located in front of the reference position of the work vehicle 1 in the front-and-rear direction. When the position of the marker MK is located in front of the reference position of the work vehicle 1, the process proceeds to S612. On the other hand, when the position of the marker MK is not located in front of the reference position of the work vehicle 1, the process proceeds to S614.

In S612, the control unit 19 moves the work vehicle 1 backward via the electric traveling mechanism 12 such that the position of the marker MK specified in S604 is matched with the reference position of the work vehicle 1.

In S614, the control unit 19 determines whether or not the position of the marker MK specified in S604 is matched with the reference position of the work vehicle 1 in the front-and-rear direction. When the position of the marker MK is not matched with the reference position of the work vehicle 1, the process proceeds to S604, and S604 to S614 are repeated until the position of the marker MK is matched with the reference position of the work vehicle 1. On the other hand, when the position of the marker MK is matched with the reference position of the work vehicle 1, the process proceeds to S616.

In S616, the control unit 19 notifies the manned forklift FL of the completion of the alignment between the work vehicle 1 and the manned forklift FL via the communication device 120. As described above, by notifying the manned forklift FL of the completion of the alignment, it is not necessary for the side of the worker who operates the manned forklift FL to determine whether or not the alignment between the work vehicle 1 and the manned forklift FL has been completed, and it is possible to start work on the side of the manned forklift FL necessary for loading and unloading the cargo CG (the pallet PL on which the cargo CG is placed) at appropriate timing when the alignment has been completed (that is, without wasting time).

As described above, according to the present embodiment, the alignment between the work vehicle 1 and the manned forklift FL can be performed with high accuracy in a short time. Further, on the side of the worker who operates the manned forklift FL, if a state in which the manned forklift FL is stopped is maintained, the alignment between the work vehicle 1 and the manned forklift FL is completed, so that the complicated operation (turning back or the like) is unnecessary. Furthermore, the fork FK can be inserted into the insertion/removal hole HL of the pallet PL only by moving the manned forklift FL forward. Therefore, the cargo CG can be loaded and unloaded via the pallet PL only by the easy operation such as forward movement of the manned forklift FL or moving up and down and sliding of the fork FK.

Note that the control unit 19 may determine whether or not the positional relation between the work vehicle 1 and the manned forklift FL is in a state in which the movement direction MD1 and the movement direction MD2 are orthogonal to each other, for example, in response to a request for alignment from the manned forklift FL before starting the alignment between the work vehicle 1 and the manned forklift FL. When the positional relation between the work vehicle 1 and the manned forklift FL is not in a state where the movement direction MD1 and the movement direction MD2 are orthogonal to each other, the control unit 19 notifies the manned forklift FL of the fact. As a result, on the side of the worker who operates the manned forklift FL, it is possible to grasp the reason the alignment is not started even though the alignment between the work vehicle 1 and the manned forklift FL is requested. In such a case, basically, on the side of the work vehicle 1, the position of the work vehicle 1 is finely adjusted such that the positional relation between the work vehicle 1 and the manned forklift FL is in a state where the movement direction MD1 and the movement direction MD2 are orthogonal to each other. This is because it is difficult to perform movement of the manned forklift FL in the lateral direction, particularly, fine adjustment in the lateral direction, but fine adjustment of the position on the manned forklift FL side is not excluded.

In the present embodiment, the case where the pallet PL (cargo CG) loaded on the cargo bed 100 of the work vehicle 1 is unloaded from the work vehicle 1 has been described as an example. However, the alignment between the work vehicle 1 and the manned forklift FL described above can be similarly applied to a case where the pallet PL (cargo CG) is loaded on the cargo bed 100 of the work vehicle 1.

Further, in the present embodiment, the alignment between the work vehicle 1 and the manned forklift FL is performed by the control unit 19 (control device) of the work vehicle 1, but the present invention is not limited thereto. For example, a server that manages the work vehicle 1 via a network may be provided, and alignment between the work vehicle 1 and the manned forklift FL may be performed by the server. In other words, a server that performs the alignment between the work vehicle 1 and the manned forklift FL described above, and a system that includes the server and the work vehicle 1 also constitute one aspect of the present invention.

<Summary of Embodiment>

1. The work vehicle of the above embodiment is a work vehicle (for example, 1) capable of autonomously moving in a work area (for example, WA), the work vehicle including:

a detection unit (for example, 18) configured to detect a position of a manned forklift (for example, FL) stopped in the work area;

a communication unit (for example, 120) configured to communicate with the manned forklift; and a control unit (for example, 19) configured to align the work vehicle with the manned forklift by moving the work vehicle forward, backward, or forward and backward based on the position of the manned forklift detected by the detection unit such that a cargo (for example, CG) is capable of being loaded and unloaded between the manned forklift and the work vehicle, wherein the alignment is performed in a positional relation in which the work vehicle and the manned forklift are in a state in which a movement direction (for example, MD1) of the work vehicle and a movement direction (for example, MD2) of the manned forklift are orthogonal to each other, the control unit starts the alignment in response to a request for the alignment from the manned forklift acquired via the communication unit, determines whether or not the positional relation between the work vehicle and the manned forklift is in the state before starting the alignment, and notifies the manned forklift that the movement direction of the work vehicle and the movement direction of the manned forklift are not orthogonal to each other via the communication unit, when the positional relation between the work vehicle and the manned forklift is not in the state According to this embodiment, highly accurate alignment between the work vehicle and the manned forklift can be easily realized. Further, according to this embodiment, it is possible to start alignment between the work vehicle and the manned forklift at timing convenient for the worker who operates the manned forklift, that is, at arbitrary timing on the worker side. Furthermore, according to this embodiment, it is possible to grasp the reason the alignment is not started even though the alignment between the work vehicle and the manned forklift is requested on the side of the worker who operates the manned forklift.

2. The work vehicle (for example, 1) of the above embodiment, wherein the control unit (for example, 19) notifies the manned forklift (for example, FL) of completion of the alignment via the communication unit (for example, 120).

According to this embodiment, it is not necessary to determine whether or not the alignment between the work vehicle and the manned forklift has been completed on the side of the worker who operates the manned forklift, and it is possible to start the work on the side of the manned forklift required for loading and unloading the cargo at appropriate timing when the alignment has been completed (that is, without wasting time).

3. The work vehicle (for example, 1) of the above embodiment, wherein the manned forklift (for example, FL) maintains a stopped state in the work area (for example, WA) during the alignment.

According to this embodiment, it is possible to realize highly accurate alignment between the work vehicle and the manned forklift in a short time.

4. The work vehicle (for example, 1) of the above embodiment, wherein the detection unit (for example, 18)

includes a camera that images a marker (for example, MK) provided on the manned forklift (for example, FL) to acquire an image, and detects the position of the manned forklift by performing image processing on the image acquired by the camera to recognize the marker.

According to this embodiment, the position of the manned forklift can be easily detected.

5. The work vehicle (for example, 1) of the above embodiment, wherein the cargo (for example, CG) is placed on a pallet (for example, PL), the work vehicle further includes a cargo bed (for example, 100) on which the pallet on which the cargo is placed is loaded, the manned forklift (for example, FL) includes a fork (for example, FK) that is insertable into and removable from a hole (for example, HL) provided in the pallet and is movable up and down in an up-and-down direction, and the control unit (for example, 19) performs the alignment such that a position of the hole provided in the pallet loaded on the cargo bed is matched with a position of the fork.

According to this embodiment, it is possible to easily load and unload the pallet (cargo placed on the pallet).

6. The control device of the above embodiment is a control device (for example) for a work vehicle (for example, 1) capable of autonomously moving in a work area (for example, WA), the control device including:

a detection unit (for example, 18) configured to detect a position of a manned forklift (for example, FL) stopped in the work area;

a communication unit (for example, 120) configured to communicate with the manned forklift; and a control unit (for example, 19) configured to align the work vehicle with the manned forklift by moving the work vehicle forward, backward, or forward and backward based on the position of the manned forklift detected by the detection unit such that a cargo (for example, CG) is capable of being loaded and unloaded between the manned forklift and the work vehicle, wherein the alignment is performed in a positional relation in which the work vehicle and the manned forklift are in a state in which a movement direction (for example, MD1) of the work vehicle and a movement direction (for example, MD2) of the manned forklift are orthogonal to each other, the control unit starts the alignment in response to a request for the alignment from the manned forklift acquired via the communication unit, determines whether or not the positional relation between the work vehicle and the manned forklift is in the state before starting the alignment, and notifies the manned forklift that the movement direction of the work vehicle and the movement direction of the manned forklift are not orthogonal to each other via the communication unit, when the positional relation between the work vehicle and the manned forklift is not in the state.

According to this embodiment, highly accurate alignment between the work vehicle and the manned forklift can be easily realized. Further, according to this embodiment, it is possible to start alignment between the work vehicle and the manned forklift at timing convenient for the worker who operates the manned forklift, that is, at arbitrary timing on the worker side. Furthermore, according to this embodiment, it is possible to grasp the reason the alignment is not started even though the alignment between the work vehicle and the manned forklift is requested on the side of the worker who operates the manned forklift.

7. The method of the above embodiment is a method for controlling a work vehicle (for example, 1) capable of autonomously moving in a work area (for example, WA), the method including:

a first step of detecting a position of a manned forklift (for example, FL) stopped in the work area;

a second step of communicating with the manned forklift; and a third step of aligning the work vehicle with the manned forklift by moving the work vehicle forward, backward, or forward and backward based on the position of the manned forklift detected in the first step such that a cargo (for example, CG) is capable of being loaded and unloaded between the manned forklift and the work vehicle, wherein the alignment is performed in a positional relation in which the work vehicle and the manned forklift are in a state in which a movement direction (for example, MD1) of the work vehicle and a movement direction (for example, MD2) of the manned forklift are orthogonal to each other, and the third step includes starting the alignment in response to a request for the alignment from the manned forklift acquired in the second step, determining whether or not the positional relation between the work vehicle and the manned forklift is in the state before starting the alignment, and notifying the manned forklift that the movement direction of the work vehicle and the movement direction of the manned forklift are not orthogonal to each other, when the positional relation between the work vehicle and the manned forklift is not in the state.

According to this embodiment, highly accurate alignment between the work vehicle and the manned forklift can be easily realized. Further, according to this embodiment, it is possible to start alignment between the work vehicle and the manned forklift at timing convenient for the worker who operates the manned forklift, that is, at arbitrary timing on the worker side. Furthermore, according to this embodiment, it is possible to grasp the reason the alignment is not started even though the alignment between the work vehicle and the manned forklift is requested on the side of the worker who operates the manned forklift.

8. The system of the above embodiment is a system including a work vehicle (for example, 1) capable of autonomously moving in a work area (for example, WA) and a server managing movement of the work vehicle, wherein the work vehicle includes a detection unit (for example, 120) detecting a position of a manned forklift (for example, FL) stopped in the work area, and a communication unit (for example, 120) communicating with the manned forklift, the server includes a control unit (for example, 19) aligning the work vehicle with the manned forklift by moving the work vehicle forward, backward, or forward and backward based on the position of the manned forklift detected by the detection unit such that a cargo (for example, CG) is capable of being loaded and unloaded between the manned forklift and the work vehicle, the alignment is performed in a positional relation in which the work vehicle and the manned forklift are in a state in which a movement direction (for example, MD1) of the work vehicle and a movement direction (for example, MD2) of the manned forklift are orthogonal to each other, the control unit starts the alignment in response to a request for the alignment from the manned forklift acquired via the communication unit, determines whether or not the positional relation between the work vehicle and the manned forklift is in the state before starting the alignment, and notifies the manned forklift that the movement direction of the work vehicle and the movement direction of the manned forklift are not orthogonal to each other via the communication unit, when the positional relation between the work vehicle and the manned forklift is not in the state.

According to this embodiment, highly accurate alignment between the work vehicle and the manned forklift can be easily realized. Further, according to this embodiment, it is possible to start alignment between the work vehicle and the manned forklift at timing convenient for the worker who operates the manned forklift, that is, at arbitrary timing on the worker side. Furthermore, according to this embodiment, it is possible to grasp the reason the alignment is not started even though the alignment between the work vehicle and the manned forklift is requested on the side of the worker who operates the manned forklift.

The invention is not limited to the foregoing embodiments, and various variations/changes are possible within the spirit of the invention.

What is claimed is:

1. A work vehicle capable of autonomously moving in a work area, the work vehicle comprising:

a positioning sensor configured to detect a position of a manned forklift stopped in the work area;

a communication device configured to communicate with the manned forklift; and at least one processor circuit with a memory comprising instructions that, when executed by the at least one processor circuit, cause the at least one processor circuit to at least:

align the work vehicle with the manned forklift by moving the work vehicle forward, backward, or forward and backward based on the position of the manned forklift detected by the positioning sensor such that a cargo is capable of being loaded and unloaded between the manned forklift and the work vehicle, wherein the alignment is performed in a positional relation in which the work vehicle and the manned forklift are in a state in which a movement direction of the work vehicle and a movement direction of the manned forklift are orthogonal to each other, the instructions causing the at least one processor circuit to at least:

start the alignment in response to a request for the alignment from the manned forklift acquired via the communication device, determine whether or not the positional relation between the work vehicle and the manned forklift is in the state before starting the alignment, and notify the manned forklift that the movement direction of the work vehicle and the movement direction of the manned forklift are not orthogonal to each other via the communication device, when the positional relation between the work vehicle and the manned forklift is not in the state.

2. The work vehicle according to claim 1, wherein the instructions further cause the at least one processor circuit to at least notify the manned forklift of completion of the alignment via the communication device.

3. The work vehicle according to claim 1, wherein the manned forklift maintains a stopped state in the work area during the alignment.

4. The work vehicle according to claim 1, wherein the positioning sensor includes a camera that images a marker provided on the manned forklift to acquire an image, and detects the position of the manned forklift by performing image processing on the image acquired by the camera to recognize the marker.

5. The work vehicle according to claim 1, wherein the cargo is placed on a pallet, the work vehicle further includes a cargo bed on which the pallet on which the cargo is placed is loaded, the manned forklift includes a fork that is insertable into and removable from a hole provided in the pallet and is movable up and down in an up-and-down direction, and the instructions further cause the at least one processor circuit to at least perform the alignment such that a position of the hole provided in the pallet loaded on the cargo bed is matched with a position of the fork.

6. A control device for a work vehicle capable of autonomously moving in a work area, the control device comprising:

a positioning sensor configured to detect a position of a manned forklift stopped in the work area;

a communication device configured to communicate with the manned forklift; and at least one processor circuit with a memory comprising instructions that, when executed by the at least one processor circuit, cause the at least one processor circuit to at least:

align the work vehicle with the manned forklift by moving the work vehicle forward, backward, or forward and backward based on the position of the manned forklift detected by the positioning sensor unit such that a cargo is capable of being loaded and unloaded between the manned forklift and the work vehicle, wherein the alignment is performed in a positional relation in which the work vehicle and the manned forklift are in a state in which a movement direction of the work vehicle and a movement direction of the manned forklift are orthogonal to each other, the instructions causing the at least one processor circuit to at least:

start the alignment in response to a request for the alignment from the manned forklift acquired via the communication device unit, determine whether or not the positional relation between the work vehicle and the manned forklift is in the state before starting the alignment, and notify the manned forklift that the movement direction of the work vehicle and the movement direction of the manned forklift are not orthogonal to each other via the communication device, when the positional relation between the work vehicle and the manned forklift is not in the state.

7. A method for controlling a work vehicle capable of autonomously moving in a work area, the method comprising:

a first step of detecting a position of a manned forklift stopped in the work area;

a second step of communicating with the manned forklift; and a third step of aligning the work vehicle with the manned forklift by moving the work vehicle forward, backward, or forward and backward based on the position of the manned forklift detected in the first step such that a cargo is capable of being loaded and unloaded between the manned forklift and the work vehicle, wherein the alignment is performed in a positional relation in which the work vehicle and the manned forklift are in a state in which a movement direction of the work vehicle and a movement direction of the manned forklift are orthogonal to each other, and the third step includes starting the alignment in response to a request for the alignment from the manned forklift acquired in the second step, determining whether or not the positional relation between the work vehicle and the manned forklift is in the state before starting the alignment, and notifying the manned forklift that the movement direction of the work vehicle and the movement direction of the manned forklift are not orthogonal to each other, when the positional relation between the work vehicle and the manned forklift is not in the state.

8. A system including a work vehicle capable of autonomously moving in a work area and a server managing movement of the work vehicle, wherein the work vehicle includes a positioning sensor detection unit detecting a position of a manned forklift stopped in the work area, and a communication device unit communicating with the manned forklift, the server includes at least one processor circuit with a memory comprising instructions that, when executed by the at least one processor circuit, cause the at least one processor circuit to at least:

align the work vehicle with the manned forklift by moving the work vehicle forward, backward, or forward and backward based on the position of the manned forklift detected by the positioning sensor unit such that a cargo is capable of being loaded and unloaded between the manned forklift and the work vehicle, the alignment is performed in a positional relation in which the work vehicle and the manned forklift are in a state in which a movement direction of the work vehicle and a movement direction of the manned forklift are orthogonal to each other, the instructions causing the at least one processor circuit to at least:

start the alignment in response to a request for the alignment from the manned forklift acquired via the communication device, unit, determine whether or not the positional relation between the work vehicle and the manned forklift is in the state before starting the alignment, and notify the manned forklift that the movement direction of the work vehicle and the movement direction of the manned forklift are not orthogonal to each other via the communication device, when the positional relation between the work vehicle and the manned forklift is not in the state.

9. The work vehicle according to claim 1, wherein during the alignment, the instructions further cause the at least one processor circuit to repeatedly detect the position of the manned forklift and moves the work vehicle forward and/or backward until the detected position of the manned forklift matches a reference position.

\* \* \* \* \*